March 12, 1968  G. ALTSCHULER  3,372,827
SAFETY VENTS FOR PLASTIC COVERED GLASS AEROSOL CONTAINERS
Filed Feb. 27, 1967
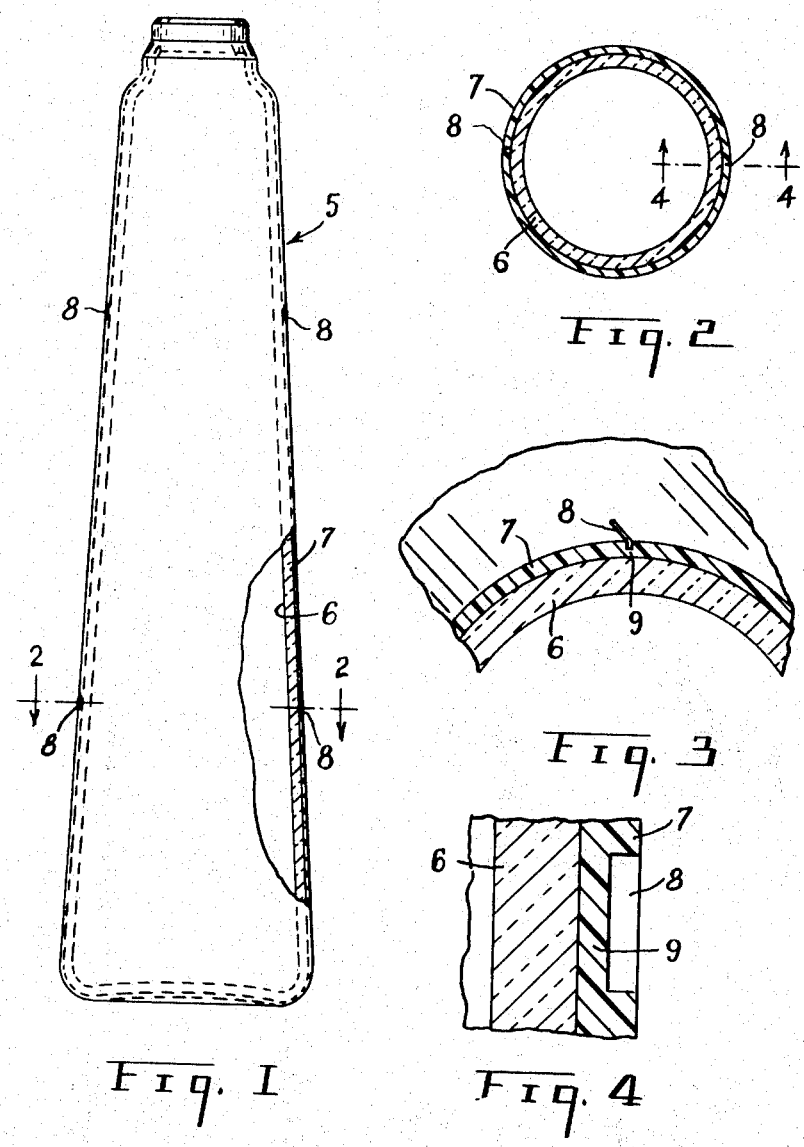
INVENTOR
G. ALTSCHULER
Fetherstonhaugh & Co.
ATTORNEYS

United States Patent Office 3,372,827
Patented Mar. 12, 1968

3,372,827
SAFETY VENTS FOR PLASTIC COVERED GLASS AEROSOL CONTAINERS
George Altschuler, 2325 Nantell St., Montreal, Quebec, Canada
Filed Feb. 27, 1967, Ser. No. 618,821
5 Claims. (Cl. 215—12)

ABSTRACT OF THE DISCLOSURE

A glass aerosol pressure bottle covered with a coating of plastic material in which the plastic coating is provided with one or more short slits disposed lengthwise of the bottle to form vents for relief of the pressure within the bottle in the event the bottle is accidentally broken. The plastic coating remains substantially intact during the escape of gas from the broken bottle.

---

This invention relates to aerosol pressure bottles of glass which are covered with a coating of plastic material.

It has been known in the past to provide safety means for plastic covered glass aerosol bottles. The plastic coating is in itself a form of safety means but, due to the relatively thin coating of plastic, it is not very effective in containing the broken particles of glass once the pressure glass bottle is broken. Known safety means have taken the form of reinforcing the plastic covering to provide a form of shock absorber should the bottle be dropped. Other safety means take the form of providing perforations through the plastic coating, the perforations penetrating to and exposing the surface of the glass bottle. Such perforations, however minute, provide unrestricted vent passages for the escape of gas from a broken glass bottle and the plastic is readily torn apart around the perforations so that particles of broken glass can be spread to the surrounding area and consequently cause serious damage to a person holding the aerosol container at the time of breakage.

The present invention consists essentially in providing safety vents for plastic covered aerosol glass containers whereby the whole surface of the glass container is completely covered with the plastic material and is only weakened at selected locations. The safety vents are in the form of a series of minute slits on the surface of the plastic covering, which slits penetrate only part way through the thickness of the covering. The slits are preferably made with a thin cutting blade having the thickness of a thin safety razor blade with a razor sharp edge. Due to the inherent characteristics of most plastic materials used to cover glass aerosol bottles the sides of the safety vent slits tend to draw together when the cutting blade is withdrawn with the result that the slits become practically invisible.

It is a primary object of the present invention to provide safety vents for plastic covered glass aerosol containers whereby gas from a broken container will escape freely without extensive rupture of the plastic covering.

A further object of the invention is to provide a continuous unbroken thickness of plastic covering for a glass aerosol container with a series of slits in the plastic penetrating only part way through the plastic material.

A further object of the invention is to provide a series of safety vent slits in a plastic covering for aerosol containers which slits are self-closing and practically invisible.

These and other objects of the invention will be apparent from the following specification and the accompanying drawings, in which:

FIG. 1 is a vertical elevation partly in section of a typical plastic covered glass aerosol container, showing the safety vents according to the present invention.

FIG. 2 is a horizontal section through the aerosol container taken on the line 2—2 of FIG. 1.

FIG. 3 is an enlarged fragmentary section of a portion of the aerosol container showing a safety vent penetrating only part way through the plastic covering.

FIG. 4 is an enlarged vertical section taken on the line 4—4 of FIG. 2.

Referring to the drawings, the aerosol container 5 consists of an inner glass bottle 6 which is entirely covered with a layer of a suitable plastic material 7. The thickness of the plastic material 7 is normally approximately 0.10 inch thick but might be more or less depending to some extent on the thickness of the glass bottle 6 and the pressure of the gas within the bottle. The pressure of the gas within the bottle may vary from 25 to 40 lbs. per sq. inch.

A series of safety vents 8 are in the form of very thin slits cut in the surface of the plastic covering 7. The vents 8 penetrate approximately half the thickness of the plastic covering 7 as is clearly shown in FIGS. 3 and 4, leaving a thin weak web 9 of plastic between the bottom of the vent and the adjacent surface of the glass bottle 6. Where the thickness of the plastic covering is approximately 0.10 inch, then the depth of the vents 8 would be approximately 0.05 inch, leaving an equal depth of solid plastic between the bottom of the vent and the adjacent surface of the glass bottle.

The location of the vents 8 will depend on the size of the container and the pressure of the gas within it. In FIGS. 1 and 2 two vents 8 are shown diametrically opposite each other and at two locations lengthwise of the container. It will be understood that more than two vents can be made at any one location lengthwise of the container.

The vents 8 are preferably made with a knife having a razor sharp edge of the fineness of a thin safety razor blade and can be made by hand or by any mechanical device.

The longitudinal length of the vents could vary with the size of the container and the number of vents. It has been found that vents having a length of ⅛-inch are satisfactory to most cases.

Due to the fact that the vents 8 are made with a very thin blade and the inherent nature of the plastic material with which the bottles are covered, there is a tendency for the sides of the vents to close together which, combined with the relatively short length of the vents, causes them to become practically invisible.

Should the glass bottle 6 become broken for any reason, due to a fall or knock or an increase of pressure within the bottle, the gas escaping through the broken bottle will cause the thin webs 9 to rupture at each of the vents 8. This will permit an immediate escape of the gas and effect a rapid reduction in gas pressure, to the extent that the gas will escape without causing the thicker plastic material surrounding the vent to rupture, thereby effectively containing the broken glass bottle 6.

Aerosol bottles made of glass covered with a coating of plastic material and embodying safety vents as above described can be safely held in the hand of a person even in the event that the glass container should be broken. Broken glass may cut into the inner surface of the plastic covering but, due to the rapid reduction in gas pressure and the localization of escaping gas to the area of the gas vents 8, broken glass will not penetrate the plastic covering and will be safely contained.

The embodiment of the invention in which an exclusive property or privilege is claimed are defined as follows:

1. Safety vents for aerosol bottles in which the said bottles comprise an inner container of glass and an outer coating of plastic material adhering to the outer surface of the glass container, the said safety vents consisting of a series of razor thin slits in the surface of the said coating of plastic material, the said slits penetrating only part way into the thickness of the plastic coating.

2. Safety vents for aerosol bottles as set forth in claim 1 in which the opposing faces of the said slits are in contact with each other to make the slits practically invisible.

3. Safety vents for aerosol bottles as set forth in claim 1 in which the plastic material between the inner edge of the slits and the adjacent surface of the inner glass container constitutes a thin rupturable web.

4. Safety vents for aerosol bottles as set forth in claim 1 in which the said razor thin slits are approximately 1/8-inch long.

5. Safety vents for aerosol bottles as set forth in claim 1 in which the said slits are disposed diametrically opposite each other on the bottle and are located at spaced apart intervals longitudinally of the bottle.

References Cited

UNITED STATES PATENTS

| | | | |
|---|---|---|---|
| 2,917,197 | 12/1959 | Glover et al. | 215—12 |
| 2,929,525 | 3/1960 | Glover et al. | 215—12 |
| 2,991,896 | 7/1961 | Glover et al. | 215—12 |

JOSEPH R. LECLAIR, *Primary Examiner.*

R. PESHOCK, *Assistant Examiner.*

UNITED STATES PATENT OFFICE

CERTIFICATE OF CORRECTION

Patent No. 3,372,827 March 12, 1968

George Altschuler

It is certified that error appears in the above identified patent and that said Letters Patent are hereby corrected as shown below:

In the heading to the printed specification, lines 4 and 5, for "George Altschuler, 2325 Nantell St., Montreal, Quebec, Canada" read -- George Altschuler, Montreal, Quebec, Canada, assignor to Dominion Glass Company Limited, Montreal, Quebec, Canada --.

Signed and sealed this 15th day of July 1969.

(SEAL)
Attest:

Edward M. Fletcher, Jr.                WILLIAM E. SCHUYLER, JR.
Attesting Officer                          Commissioner of Patents